2 Sheets—Sheet 1.

R. De GRAY.
BAND PULLING AND LOCKING MACHINES FOR BALING COTTON.

No. 181,052. Patented Aug. 15, 1876.

Witnesses:
James Martin Jr.
J. P. Theodore Taug.

Inventor:
Richard De Gray
by
Mason, Fenwick & Lawrence,
Attys.

2 Sheets—Sheet 2.

R. De GRAY.
BAND PULLING AND LOCKING MACHINES FOR BALING COTTON.

No. 181,052. Patented Aug. 15, 1876.

Witnesses:
James Martin Jr
J. P. Theodore Lang

Inventor:
Richard De Gray
by
Munn, Fenwick & Lawrence

UNITED STATES PATENT OFFICE.

RICHARD DE GRAY, OF NEW ORLEANS, LOUISIANA.

IMPROVEMENT IN BAND PULLING AND LOCKING MACHINES FOR BALING COTTON.

Specification forming part of Letters Patent No. 181,052, dated August 15, 1876; application filed June 30, 1876.

*To all whom it may concern:*

Be it known that I, RICHARD DE GRAY, of New Orleans, in the parish of Orleans and State of Louisiana, have invented new and useful Improvements in Band Pulling and Locking Machines, which improvements are fully set forth in the following specification, reference being had to the accompanying drawings, in which—

Figure 1:
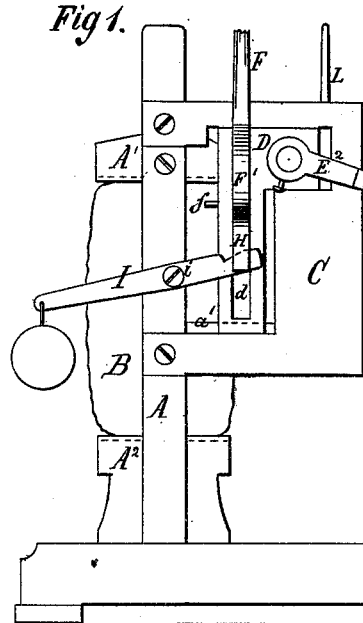
Figure 2:
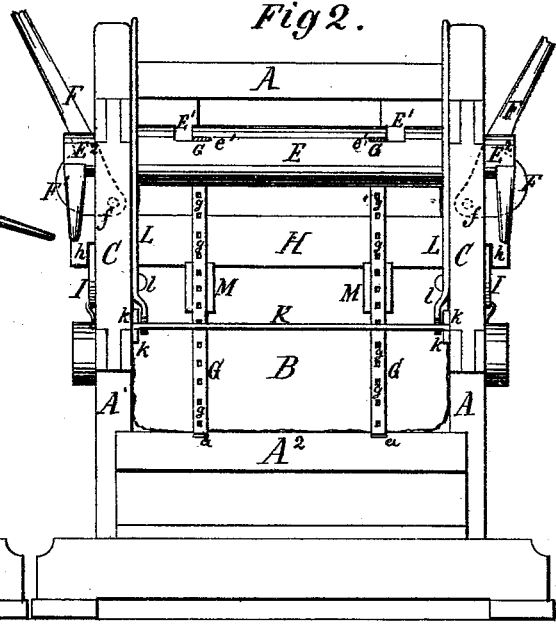
Figure 3:
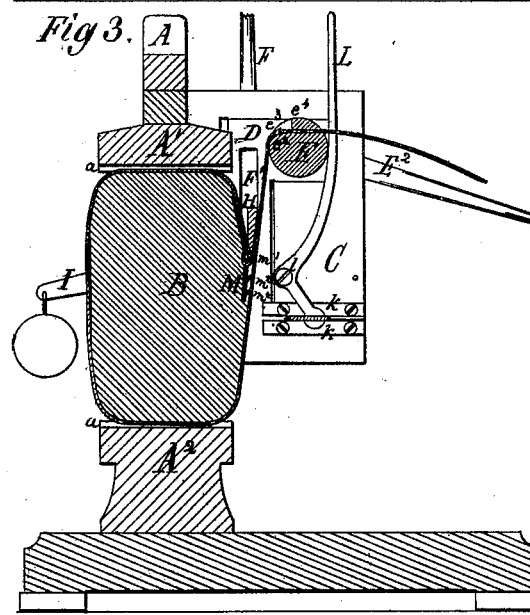
Figure 4:
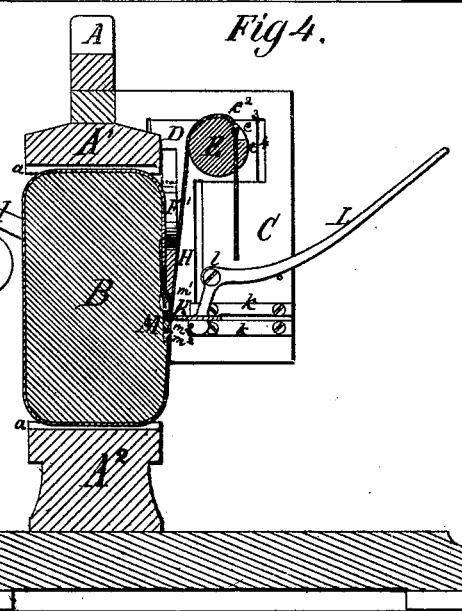
Figure 5:
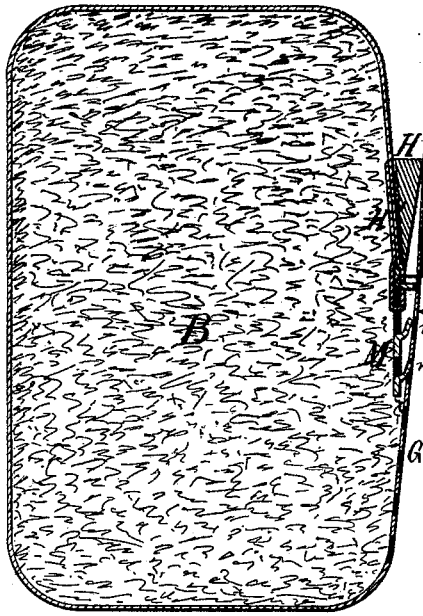
Figure 6:
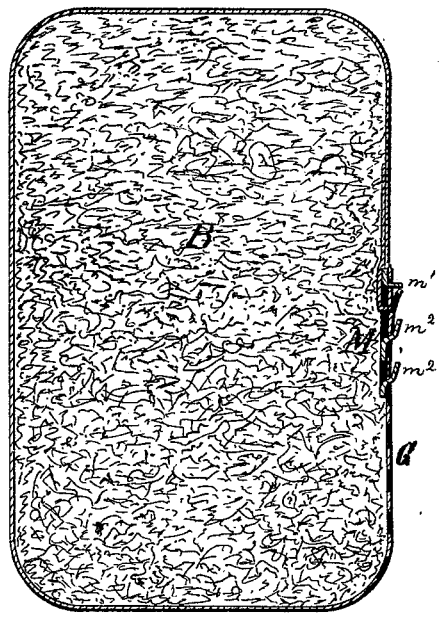
Figure 7:
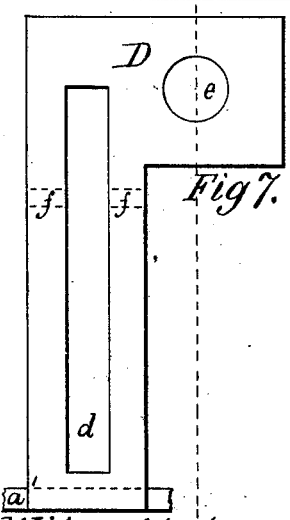
Figure 8:
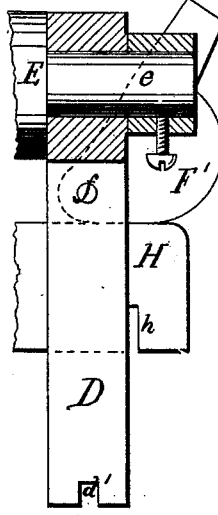
Figure 9:
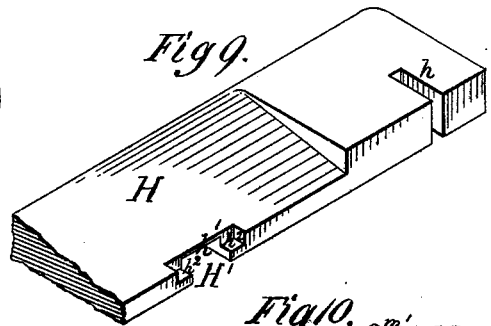
Figure 10:

Figure 1 is a side view of my improved band pulling and locking machine. Fig. 2 is a front view of the same. Fig. 3 is a cross-section through the same in the direction of one of the tightening-bands. Fig. 4 is a similar section, but showing the bale tied and the band locked to its buckle. Fig. 5 is an enlarged cross-section of a bale and band, with the bands drawn tight and ready for the operation of locking them with the buckles. Fig. 6 is a similar section as Fig. 5, showing the band locked with the buckle and removed from the press. Fig. 7 is an enlarged detailed side view of the movable bearings for the band-tightening apparatus. Fig. 8 is a front view and partial section of the same. Fig. 9 is an enlarged perspective view of one side of the buckle-bar. Fig. 10 is a perspective view of the buckle.

The nature of my invention consists in certain constructions, combinations, and arrangements of parts hereinafter described and specifically claimed, whereby an improved machine for tightening and locking bands around bales is produced.

The object of my invention is to rapidly and simultaneously draw tight and lock all the bands around a bale while the bale is under pressure in the press.

To enable others skilled in the art to understand my invention I will proceed to describe it.

In the accompanying drawings, A represents the frame, and $A^1$ the upper platen, and $A^2$ the lower platen, of a press. The said platens are of ordinary construction, and are provided, as usual, with channels $a$ for the easy insertion of the bale-bands. The Figs. 1, 3, and 4 represent a bale, B, sufficiently compressed between the platens. The frame A is provided with an extended frame, C, on either side, which frames serve as supports for the tightening and locking apparatus of the bale-bands. The frames C have each a horizontally-sliding bearing, D, of the shape of an inverted L, which bearings support the journals $e$ of the band-tightening shaft E and the pivots $f$ of the cam-levers F. The shaft E is provided with transverse notches $E^1$, wide enough to easily receive the bands G. Each of the said notches $E^1$ extends at the bottom into a transverse slot, $e^1$, for the reception of the band G, and, to avoid a sharp corner and consequent breaking of the band, the bottom of each slot $e^1$ joins the circumference of the shaft E by a tangential curve, $e^2$, which is provided with a ratchet-tooth, $e^3$. To facilitate the slipping forward of the bale-band G over the said ratchet-tooth, the metal above the front end of each slot $e^1$ is cut away sufficiently, as seen at $e^4$, so the ratchet-tooth may easily enter one of the holes $g$ in the bale-band provided for the purpose, and thus prevent the bale-band from slipping when the shaft E is turned on. The extended journals of the shaft E are provided with levers $E^2$ for operating the shaft.

The cams $F'$ of the cam-levers F are inserted into vertical slots $d$ in the bearings D, and operate upon the top of a transverse bar, H, which is movable in the said slot, and is at each end provided with an open slot, $h$, outside of the frames C. The said slots $h$ receive the ends of the weighted levers I pivoted at $i$, whereby the bar H is kept in contact with the cams $F'$. The bar H is provided with vertical grooves $H'$ for the reception of the bale-bands, and with notches $h^1$ at the bottoms of the said grooves for the reception of the buckles. The said notches $h^1$ are at the rear side of the bar H, thereby leaving laps $h^2$ at the right and left of the grooves $H'$, and at the front of the bar H, which laps prevent the buckles from slipping out of the notches when the bands are tightened.

The bearings D are prevented from lateral play at the foot by grooves $d'$, wherewith they ride upon tongues $a'$ in the frames C. Between two horizontal end bearings, $k$, on the frames C a plate, K, is supported, which is operated by the levers L, pivoted at $l$, and inserted, with their short arms, into notches or slots in the said plate, or otherwise connected with it.

The buckles M used for uniting the band ends are made of oblong pieces of metal plate, and have transverse slots $m$ for the reception of the bands G, which are turned over the metal of the buckle, and prevented from slipping by a tongue, $m^1$, cut out and bent up from the metal of the buckle, and inserted into one of the holes $g$ in the band. Two or several more tongues, $m^2$, cut out and bent up from the metal of the buckle in a direction opposite that of the tongue $m^1$, serve to enter a like number of holes $g$ at the other end of the bale-band, for the purpose of fastening the same around the bale.

Operation: The bale B, being sufficiently compressed between the platens $A^1$ $A^2$, the bands are passed through their channels $a$ in the lower platen $A^2$, thence up in front of the press, and through the channels $a$ of the upper platen $A^1$, and down in the grooves H' and below the buckle-bar H, where the buckles M are fastened to them in the above-described manner. The buckle-bar is now moved close against the bale, the bands are drawn back by hand until the buckles enter the notches $h^1$. The other sides of the bands are then inserted into the notches $E^1$ of the shaft E, and slipped into the slots $e^1$ and over the ratchet-teeth $e^3$ until the latter engage each with a hole, $g$, of the said bands. The two opposite ends of the bands are now simultaneously drawn tight by turning the levers $E^2$ and F down. The buckle-bar H is thereby moved down with the buckles M, and the revolving shaft E draws the bands up in close proximity to the buckles. The levers F are moved down until they strike the bar H, which finishes the downward motion of the said bar; or, in other words, the shaft E is turned in the described manner until the operators find the tension sufficient and the tongues $m^2$ opposite their respective holes $g$. The entrance of the said tongues $m^2$ into the said holes $g$ is effected by the plate K, which, by moving down the levers L, is forced against the bands G just between the tongues $m^1$ and $m^2$, and thereby brings the said bands in close contact with the buckles M. The tension of the bands is now slacked, and the bands become firmly locked. The bands are now cut off from their continuations, and the bale is removed from the press, its appearance, together with the locked bands, being represented by a section in Fig. 6. It is readily seen that any number of bands may thus be tightened around and locked upon a bale in the same time which is necessary for tightening and locking a single band with machines of different construction from mine. It is also evident that the simplicity of operation of my machine permits the employment of raw hands, while the simplicity and durability of construction insures the packer almost against any of those accidents so common with complicated and overstrained machinery as heretofore used for the same purpose.

Having described my invention, what I claim, and desire to secure by Letters Patent, is—

1. In a band-tightening machine, the shaft E, having slots $e^1$ and ratchet-teeth $e^3$, constructed and operating substantially as set forth.

2. In a band-tightening machine, the buckle-bar H, having grooves H' and notches $h^1$ for the purpose of drawing tight the buckle ends of the bale-bands, substantially as set forth.

3. In a band-tightening machine, the sliding bearings D, whereby the upper and lower band-tightening apparatus are supported, substantially as and for the purpose set forth.

4. In a band-tightening machine, the plate K, operating substantially as set forth.

5. The shaft E and the sliding bearings D, substantially as set forth.

6. The combination of the buckle-bar H and the cams F', substantially as set forth.

7. The combination of shaft E, the buckle-bar H, and the bearings D, substantially as described.

8. The shaft E, the buckle-bar H, and the sliding plate K, combined and operating substantially as set forth.

9. The combination of the plate K and the levers L, substantially as and for the purpose set forth.

10. The buckle-bar H and the weighted levers I, constructed and operating substantially as set forth.

Witness my hand in the matter of my application for a patent for an improved band pulling and locking machine this 28th day of June, 1876.

RICHARD DE GRAY.

Witnesses:
J. ANDREWS,
GEO. O. ALLEN.